(12) United States Patent
Lee et al.

(10) Patent No.: US 8,209,535 B2
(45) Date of Patent: Jun. 26, 2012

(54) AUTHENTICATION BETWEEN DEVICE AND PORTABLE STORAGE

(75) Inventors: Byung-rae Lee, Yongin-si (KR); Tae-sung Kim, Seoul (KR); Joong-chul Yoon, Seoul (KR); Kyung-im Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1199 days.

(21) Appl. No.: 11/085,160

(22) Filed: Mar. 22, 2005

(65) Prior Publication Data

US 2005/0210279 A1   Sep. 22, 2005

Related U.S. Application Data

(60) Provisional application No. 60/575,757, filed on Jun. 1, 2004.

(30) Foreign Application Priority Data

Mar. 22, 2004   (KR) .................. 10-2004-0019446
May 31, 2004   (KR) .................. 10-2004-0039382

(51) Int. Cl.
*H04L 29/06* (2006.01)
(52) U.S. Cl. ......... 713/169; 713/171; 713/178; 380/247
(58) Field of Classification Search .......... 713/150–181, 713/194; 380/258, 277–286, 247
See application file for complete search history.

(56) References Cited

U.S. PATENT DOCUMENTS

| | | | |
|---|---|---|---|
| 5,371,794 A | 12/1994 | Diffie et al. | |
| 5,457,746 A | 10/1995 | Dolphin | |
| 5,677,953 A | 10/1997 | Dolphin | |
| 5,703,951 A | 12/1997 | Dolphin | |
| 5,949,877 A * | 9/1999 | Traw et al. | 713/171 |
| 7,010,809 B2 * | 3/2006 | Hori et al. | 726/26 |
| 7,373,507 B2 * | 5/2008 | Simms | 713/168 |

(Continued)

FOREIGN PATENT DOCUMENTS

EP   1 061 514 A3   12/2000

(Continued)

OTHER PUBLICATIONS

W. Rankl & W. Effing, "Smart Card Handbook", 2000 (per Amazon.com, published date: Sep. 18, 2000), published by John Wiley & Sons, Ltd., Second Edition, ISBN: 0-471-98875-8, pp. 232-233, 269, 314-327.*

(Continued)

*Primary Examiner* — Edward Zee
*Assistant Examiner* — Chi Nguy
(74) *Attorney, Agent, or Firm* — Sughrue Mion, PLLC (57) ABSTRACT

For digital rights management (DRM), a method for performing authentication between a device and a portable storage, which is performed by the device, includes transmitting a first key to the portable storage, receiving a third key and a first encrypted random number obtained by encrypting a first random number using the first key from the portable storage and decrypting the first encrypted random number using a second key related with the first key, generating a second encrypted random number by encrypting a second random number using the third key and transmitting the second encrypted random number to the portable storage, and generating a session key using the first random number and the second random number. The technique guarantees secure authentication between the device and the portable storage for DRM.

8 Claims, 6 Drawing Sheets

U.S. PATENT DOCUMENTS

| | | |
|---|---|---|
| 2002/0165825 A1 | 11/2002 | Matsushima et al. |
| 2004/0010467 A1* | 1/2004 | Hori et al. .................... 705/50 |
| 2004/0034766 A1* | 2/2004 | Sakamura et al. ................ 713/2 |
| 2005/0033964 A1* | 2/2005 | Albanese et al. ............ 713/171 |
| 2006/0143453 A1* | 6/2006 | Imamoto et al. ............. 713/169 |
| 2006/0155855 A1* | 7/2006 | Hamai ........................ 709/227 |

FOREIGN PATENT DOCUMENTS

| | | |
|---|---|---|
| EP | 0 994 475 B1 | 7/2001 |
| EP | 1 185 021 A1 | 3/2002 |
| EP | 1 164 747 B1 | 9/2004 |
| JP | 07-131453 A | 5/1995 |
| JP | 2002-229965 A | 8/2002 |
| JP | 2002-28019 A | 9/2002 |
| JP | 2002-344438 A | 11/2002 |
| JP | 2002-344921 A | 11/2002 |
| JP | 2003-122643 A | 4/2003 |
| JP | 2003-317042 A | 11/2003 |
| WO | 02087144 A1 | 10/2002 |
| WO | 03/038571 A1 | 5/2003 |

OTHER PUBLICATIONS

W. Rankl et al: "Smart Card Handbook", Pushlishing House of Electronics Industry, Dec. 31, 2000, Second Edition, pp. 260-266.

Chinese Office Action issued on Mar. 30, 2011 in the corresponding Chinese Patent Application No. 200580009261.9.

Menezes, A., et al., "Handbook of Applied Cryptography", 1997, pp. 489-590, CRC Press, Inc.

Housley, R., et al., "Internet X.509 Public Key Infrastructure Certificate and Certificate Revocation List (CRL) Profile", Apr. 2002, pp. 1-129.

Supplementary European Search Report dated Apr. 26, 2011, in Application No. 05726868.2.

Communication issued on Dec. 8, 2011 by the Canadian Intellectual Property Office in the corresponding Canadian Patent Application No. 2560474.

* cited by examiner

AUTHENTICATION BETWEEN DEVICE AND PORTABLE STORAGE

CROSS-REFERENCE TO RELATED APPLICATIONS

This application claims priority from Korean Patent Application Nos. 10-2004-0019446 filed on Mar. 22, 2004, and 10-2004-0039382 filed on May 31, 2004 in the Korean Intellectual Property Office, and U.S. Provisional Patent Application No. 60/575,757 filed on Jun. 1, 2004 in the United States Patent and Trademark Office, the disclosures of which are incorporated herein by reference in their entirety.

BACKGROUND OF THE INVENTION

1. Field of the Invention

The present invention relates to digital rights management (DRM) technology, and more particularly, to a technique for authentication between a device and a portable storage for DRM.

2. Description of the Related Art

Recently, digital rights management (DRM) has been actively researched and developed. Commercial services using DRM are increasingly being used. DRM needs to be used because of the following various characteristics of digital content. That is to say, unlike analog data, digital content can be copied without loss and can be easily reused, processed, and distributed, and only a small amount of cost is needed to copy and distribute the digital content. However, a large amount of cost, labor, and time are needed to produce the digital content. Thus, when the digital content is copied and distributed without permission, a producer of the digital content may lose his/her profit, and his/her enthusiasm for creation may be discouraged. As a result, development of digital content business may be hampered.

There were several efforts to protect digital content. Conventionally, digital content protection has concentrated on preventing unauthorized access to digital content, such that only those people who have paid are allowed to access the digital content.

Thus, people who paid to access the digital content are allowed to access the unencrypted digital content, while people who did not pay are not allowed to access the digital content. In this case, when a person who paid intentionally distributes the digital content to other people, however, these other people can use the digital content without paying. To solve this problem, DRM was introduced. In DRM, any one is allowed to freely access encoded digital content, but a license referred to as a rights object is needed to decode and execute the digital content. Accordingly, the digital content can be more effectively protected by using DRM.

The concept of digital rights management (DRM) will be described with reference to FIG. 1. DRM relates to management of contents (hereafter, referred to as encrypted contents) protected using a method such as encryption or scrambling, and rights objects allowing access to the encrypted contents.

Figure 1:
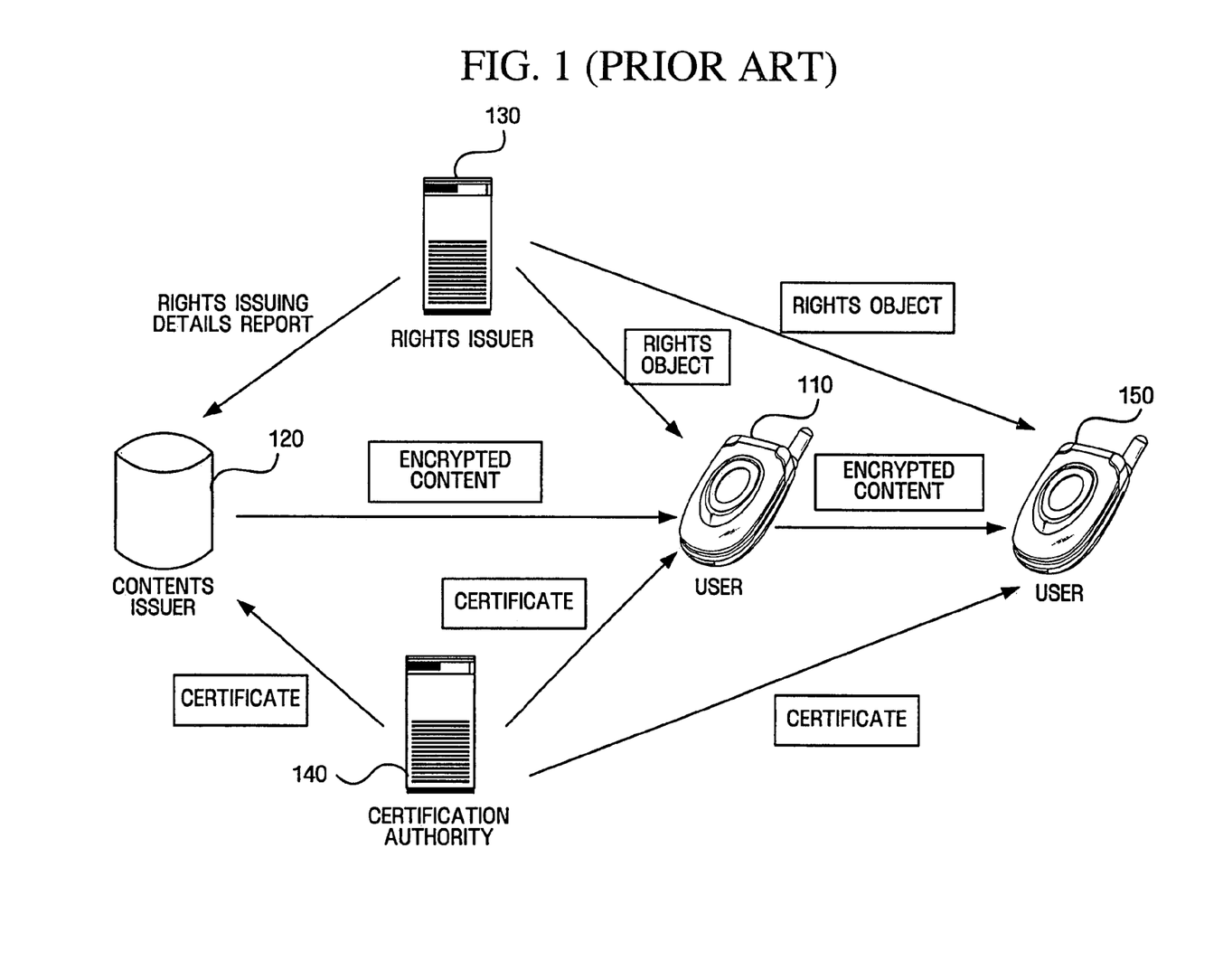
FIG. 1 is a conceptual diagram of conventional digital rights management (DRM)

Referring to FIG. 1, a DRM system includes users 110 and 150 wanting to access content protected by DRM, a contents issuer 120 issuing content protected through DRM, a rights issuer 130 issuing a rights object containing a right to access the content, and a certification authority 140 issuing a certificate.

In operation, the user 110 can obtain desired content from the contents issuer 120 in an encrypted format protected by DRM. The user 110 can obtain a license to play the encrypted content from a rights object received from the rights issuer 130. Then, the user 110 can play the encrypted content. Since encrypted contents can be circulated or distributed freely, the user 110 can freely transmit the encrypted content to the user 150. The user 150 needs the rights object to play the encrypted content. The rights object can be obtained from the rights issuer 130. Meanwhile, the certification authority 140 issues a certificate indicating that the contents issuer 120 is authentic and the users 110 and 150 are proper users. The certificate may be embedded into devices used by the users 110 and 150 when the devices are manufactured and may be reissued by the certification authority 140 after a predetermined duration has expired.

As described above, DRM protects the profits of those producing or providing digital contents and thus may be helpful in promoting the growth of the digital content industry. However, there is inconvenience practically although a rights object or encrypted content can be transferred between the users 110 and 150 using mobile devices. Rights objects and encrypted contents can be easily moved between devices when a portable storage is used. In this situation, authentication is needed as a precondition for enabling safe data transmission between a device and a portable storage intermediating between devices.

SUMMARY OF THE INVENTION

The present invention provides a method for safe authentication between a device and a portable storage.

The present invention also provides a device and a portable storage for secure authentication.

The above stated objects as well as other objects, features and advantages, of the present invention will become clear to those skilled in the art upon review of the following description, the attached drawings and appended claims.

According to an aspect of the present invention, there is provided a method for authentication between a device and a portable storage, which is performed by the device. The method includes transmitting a first key to the portable storage, receiving a third key and a first encrypted random number obtained by encrypting a first random number using the first key from the portable storage and decrypting the first encrypted random number using a second key related with the first key, generating a second encrypted random number by encrypting a second random number using the third key and transmitting the second encrypted random number to the portable storage, and generating a session key using the first random number and the second random number.

According to another aspect of the present invention, there is provided a method for authentication between a device and a portable storage, which is performed by the portable storage, the method comprising receiving a first key, obtaining a first encrypted random number by encrypting a first random number using a first key and transmitting the first encrypted random number and a third key, receiving a second encrypted random number obtained by encrypting a second random number using the third key from the device and decrypting the second encrypted random number using a fourth key, and generating a session key using the first random number and the second random number.

According to still another aspect of the present invention, there is provided a method for safe data transmission between a device and a portable storage, the method comprising setting an initial value of a send sequence counter, embedding a value of the send sequence counter in an application protocol data unit (APDU) to be transmitted to the portable storage while increasing the send sequence counter by 1 from the initial value after embedding the value of the send sequence counter in the APDU, and receiving the APDU at the portable storage and determining whether the value of the send sequence counter embedded in the received APDU is correct.

According to yet another aspect of the present invention, there is provided a method for safe data transmission between a device and a portable storage, the method comprising setting an initial value of a send sequence counter, embedding a value of the send sequence counter in an application protocol data unit (APDU) to be transmitted to the device while increasing the send sequence counter by 1 from the initial value after embedding the value of the send sequence counter in the APDU, and receiving the APDU at the device and determining whether the value of the send sequence counter embedded in the received APDU is correct.

According to a further aspect of the present invention, there is provided a portable storage comprising an interface unit for connecting with a device, a public-key encryption module which encrypts a first random number using a first key obtained from a device certificate received from the device connected through the interface unit and obtains a second random number by decrypting an encrypted second random number received from the device through the interface unit using a fourth key, and a session key generation module which generates a session key using the first random number and the second random number.

According to another aspect of the present invention, there is provided a device comprising an interface unit for connecting with a portable storage, a public-key encryption module which obtains a first random number by decrypting an encrypted first random number received from the portable storage through the interface unit using a second key and encrypts a second random number using a third key obtained from a portable storage certificate received from the portable storage connected through the interface unit, and a session key generation module which generates a session key using the first random number and the second random number.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, embodiments of the present invention will be described in detail with reference to the attached drawings.

Before the detailed description is set forth, terms used in this specification will be described briefly. The following description of terms is to be construed for a better understanding of the specification and terms that are not explicitly defined herein are not intended to limit the broad aspects of the invention.

Public-Key Cryptography

Public-key cryptography is referred to as an asymmetric cipher in which a key used for encryption is different from a key used for decryption. A public-key algorithm is open to the public, but it is impossible or difficult to decrypt original content with only a cryptographic algorithm, an encryption key, and ciphered text. Examples of a public-key cryptographic system include Diffie-Hellman cryptosystems, RSA cryptosystems, ElGamal cryptosystems, and elliptic curve cryptosystems. Public-key cryptography is about 100-1000 times slower than symmetric-key cryptography. Consequently, public-key cryptography is usually used for key exchange and digital signature, and not for encryption of content.

Symmetric-Key Cryptography

Symmetric-key cryptography is a symmetric cipher referred to as secret-key cryptography using the same key for encryption and decryption. A data encryption standard (DES) is a well-known symmetric cipher. Recently, applications using an advanced encryption standard (AES) have increased.

Certificate

A certification authority certifies users of a public key with respect to a public-key cipher. A certificate is a message containing a public key and a person's identity information which are signed by the certification authority using a private key. Accordingly, the integrity of the certificate can be easily considered by applying the public key of the certification authority to the certificate, and therefore, attackers are prevented from modulating a user's public key.

Digital Signature

A digital signature is generated to indicate that a document has been written by a genuine signer. Examples of a digital signature are an RSA digital signature, an ElGamal digital signature, a DSA digital signature, and a Schnorr digital signature. When the RSA digital signature is used, a sender encrypts a message with his/her private key and sends the encrypted message to a recipient. The recipient decrypts the encrypted message. In this case, it is proved that the message has been encrypted by the sender.

Random Number

A random number is a sequence of numbers or characters with random properties. Since it costs a lot to generate a complete random number, a pseudo-random number may be used.

Portable Storage Device

A portable storage device used in the present invention includes a non-volatile memory such as a flash memory which data can be written to, read from, and deleted from and which can be connected to a device. Examples of such portable storage device are smart media, memory sticks, compact flash (CF) cards, xD cards, and multimedia cards. Hereinafter, a secure multimedia card (MMC) will be explained as a portable storage device.

Figure 2:
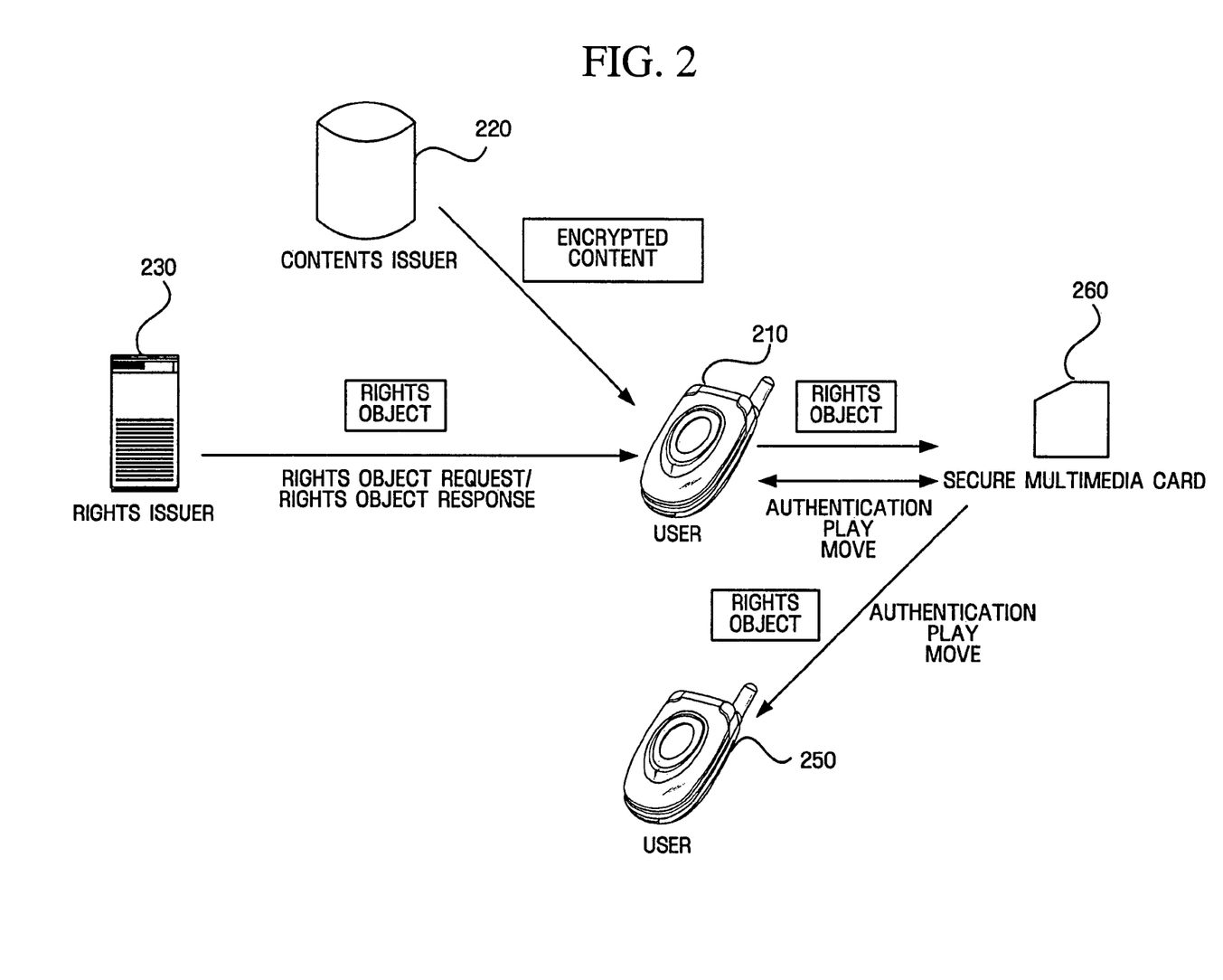
FIG. 2 is a schematic diagram illustrating the conception of a digital right in an embodiment of the present invention.

FIG. 2 is a schematic diagram illustrating the conception of a digital right in an embodiment of the present invention.

A user 210 can obtain encrypted content from a contents issuer 220. The encrypted content is content protected through digital rights management (DRM). To play the encrypted content, a rights object for the encrypted content is needed. A rights object contains a definition of a right to the content and constraints to the right, and may contain a right to the rights object itself. An example of the right to the content may be a playback. Examples of the constraints may be the number of playbacks, a playback time, and a playback duration. An example of the right to the rights object may be a move or a copy. In other words, a rights object containing a right to move may be moved to another device or a secure multimedia card. A rights object containing a right to copy may be copied to another device or a secure multimedia card. When the rights object is moved, the original rights object before the move is deactivated (i.e., the rights object itself is deleted or a right contained in the rights object is deleted). However, when the rights object is copied, the original rights object may be used in an activated state even after the copy.

After obtaining the encrypted content, the user 210 may request a rights object from a rights issuer 230 to obtain a right to play. When the user 210 receives the rights object together with a rights object response from the rights issuer 230, the user 210 can play the encrypted content using the rights object. Meanwhile, the user 210 may transfer the rights object to a user 250 having a corresponding encrypted object via a portable storage. The portable storage may be a secure multimedia card 260 having a DRM function. In this case, the user 210 performs mutual authentication with the secure multimedia card 260 and then moves the rights object to the secure multimedia card 260. To play the encrypted content, the user 210 requests a right to play from the secure multimedia card 260 and receives the right to play from the secure multimedia card 260. The user 210 can play the encrypted content using the right to play. Meanwhile, after performing mutual authentication with the user 250, the secure multimedia card 260 allows the rights object to be moved to the user 250 and allows the user 250 to play the encrypted content. The operation between the device of the user 210 and the secure multimedia card 260 will be described with reference to FIGS. 3 and 4. In embodiments of the present invention, authentication between a device and a secure multimedia card is needed to enable the device to use the secure multimedia card. An authentication procedure will be described in detail with reference to FIG. 3. Here, a subscript "H" of an object indicates that the object is possessed or generated by a host (i.e., a device) and a subscript "S" of an object indicates that the object is possessed or generated by a secure multimedia card.

Figure 3:
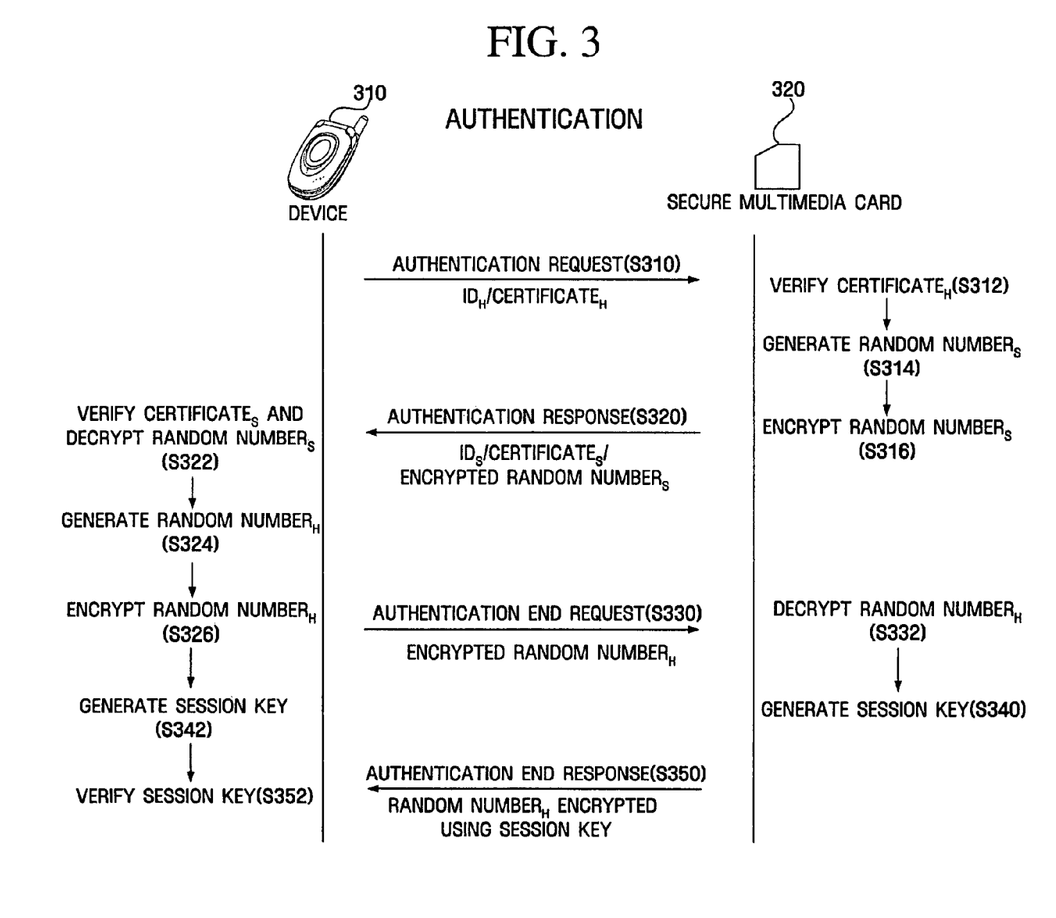
FIG. 3 is a diagram illustrating an authentication procedure according to an embodiment of the present invention.

FIG. 3 is a diagram illustrating an authentication procedure according to an embodiment of the present invention. In the authentication procedure, a device 310 and a secure multimedia card 320 authenticate each other's genuineness and exchange random numbers for generation of a session key. The session key can be generated using these random numbers obtained through the authentication. In FIG. 3, descriptions above arrowed lines relate to a command requesting another device to perform a certain operation and descriptions below the arrow-headed lines relate to a parameter involved with the command or data transported in correspondence to the command. In an embodiment of the present invention, the device 310 issues all commands for the authentication and the secure multimedia card 320 performs operations corresponding to the command. For example, a command such as an authentication response may be sent from the device 310 to the secure multimedia card 320. Then, the secure multimedia card 320 sends its $ID_S$, a certificates, and an encrypted random numbers to the device 310 in response to the authentication response. In another embodiment of the present invention, both the device 310 and the secure multimedia card 320 may issue commands. For example, the secure multimedia card 320 may send the authentication response together with the $ID_S$, the certificates, and the encrypted random numbers to the device 310. Detailed descriptions of the authentication procedure will be set forth below.

The device 310 and the secure multimedia card 320 use a pair of related keys when exchanging significant information such as random numbers. In detail, each of the device 310 and the secure multimedia card 320 has a key pair comprised of two related keys. The device 310 has a first key and a second key. Information encrypted using the first key can be decrypted using the second key and information encrypted using the second key can be decrypted using the first key. One of the two keys may be made public to and widely distributed to other devices and secure multimedia cards. For example, the first key may be used as a public key that other devices can read and the second key may be used as a private key that is kept secret not to be ready by the other devices. Similarly, the secure multimedia card 320 has a third key that is made public to be read by other devices and a fourth key that is kept secret not to be read by the other devices.

In operation S310, the device 310 sends an authentication request to the secure multimedia card 320. When requesting authentication, the device 310 sends a device public $key_H$ to the secure multimedia card 320. In operation S310, the device public $key_H$ is sent through a device $certificate_H$ issued to the device 310 by a certification authority. The device $certificate_H$ contains the device public $key_H$ and is signed with a digital signature of the certification authority. Based on the device $certificate_H$, the secure multimedia card 320 can authenticate the device 310 and obtain the device public $key_H$. A device $ID_H$ may be sent together with the device $certificate_H$.

In operation S312, the secure multimedia card 320 determines whether the device $certificate_H$ is expired and verifies whether the device $certificate_H$ is valid using a certificate revocation list (CRL). If the device $certificate_H$ is expired or is registered in the CRL, the secure multimedia card 320 may reject mutual authentication with the device 310. In this case, the secure multimedia card 320 reports the rejection to the device 310 and then the device 310 stops a DRM procedure. Meanwhile, when the device $certificate_H$ has expired or has been discarded, the device 310 may commence a procedure for obtaining the device $certificate_H$. If the $certificate_H$ is not registered in the CRL, the secure multimedia card 320 obtains the device public $key_H$ using the device $certificate_H$. Here, the DRM procedure is continued.

In operation S314, the secure multimedia card 320 generates a random $number_S$. In operation S316, the random $number_S$ is encrypted using the device public $key_H$. In operation S320, an authentication response procedure is performed by sending an authentication response command from the device 310 to the secure multimedia card 320 or from the secure multimedia card 320 to the device 310. During the authentication response procedure, the secure multimedia card 320 sends the secure multimedia card public $key_S$ and an encrypted random numbers to the device 310. In an embodiment of the present invention, instead of the secure multimedia card public $key_S$, a secure multimedia card certificates may be sent. In another embodiment of the present invention, the secure multimedia card 320 may send the secure multimedia card certificates, the encrypted random $number_S$, and information regarding a time at which the CRL of the secure multimedia card 320 issues (referred to as "secure multimedia card CRL issuing time information") to the device 310. In this case, the device 310 and the secure multimedia card 320 can share a most updated CRL. Meanwhile, since the CRL is not frequently updated generally, the secure multimedia card CRL issuing time information is sent before the CRL is sent to reduce overhead occurring during the authentication procedure. When the secure multimedia card CRL issuing time information is sent, it may be encrypted and transmitted together with, or separately from, the random number$_S$. A secure multimedia card ID$_S$ may also be transmitted.

In operation S322, the device 310 receives the secure multimedia card certificate$_S$ and the encrypted random number$_S$, authenticates the secure multimedia card 320 by verifying the secure multimedia card certificate$_S$, obtains the secure multimedia card public key$_S$, and obtains the random number$_S$ by decrypting the encrypted random number$_S$ using a device private key$_H$. The secure multimedia card certificate$_S$ is verified by determining whether it is expired and whether it is registered in the CRL. Next, in operation S324, the device 310 generates a random number$_H$. In operation S326, the device 310 encrypts the random number$_H$ using the secure multimedia card public key$_S$. Thereafter, an authentication end request is transmitted from the device 310 to the secure multimedia card 320 in operation S330 where the device 310 sends the encrypted random number$_H$ to the secure multimedia card 320. In an embodiment of the present invention, the device 310 may send information regarding a time at which the CRL of the device 310 issues (referred to as "device CRL issuing time information") to the secure multimedia card 320 together with the encrypted random number$_H$. Here, the device CRL issuing time information may be encrypted and transmitted together with or separately from the random number$_H$.

In operation S332, the secure multimedia card 320 receives and decrypts the encrypted random number$_H$ using the secure multimedia card private key$_S$. In operations S340 and S342, each of the device 310 and the secure multimedia card 320 generate a session key using its own random number and the other's random number. Here, since both the device 310 and the secure multimedia card 320 generate their own random number and use their own and the other's random numbers, randomness is greatly increased and secure authentication is possible. In other words, even if one of the device 310 and the secure multimedia card 320 has weak randomness, the other of them provides supplemental randomness.

Through the above-described operations, the device 310 and the secure multimedia card 320 can mutually authenticate each other and share the session key. In operation S350, an authentication end response is transmitted from the secure multimedia card 320 to the device 310 to verify whether the session keys respectively generated by the device 310 and the secure multimedia card 320 are identical with each other. In other words, one of the device 310 and the secure multimedia card 320 encrypts information known to the other one using its session key and transmits the encrypted information to the other one, which decrypts the encrypted information using its session key, thereby verifying whether each other's session keys are identical. In an embodiment of the present invention, the secure multimedia card 320 encrypts the random number$_H$ generated by the device 310 using its session key and transmits the encrypted random number$_H$ to the device 310. Then, in operation S352, the device 310 receives and decrypts the encrypted random number$_H$ using its session key and determines whether the random number$_H$ is restored to verify whether the session key is generated properly. In another embodiment of the present invention, a predetermined period of time after transmitting the authentication end request in operation S330, the device 310 encrypts the random numbers generated by the secure multimedia card 320 using the session key generated by the device 310 and transmits the encrypted random number$_S$ to the secure multimedia card 320. Then, the secure multimedia card 320 decrypts the encrypted random numbers using its session key, such that, whether the session key is generated properly can be verified. In an embodiment of the present invention, if the session key is not properly generated, the authentication is performed all over again. In another embodiment of the present invention, if the session key is not properly generated, the DRM procedure between the device 310 and the secure multimedia card 320 is terminated.

In an embodiment of the present invention, a random number may be generated using a random number generation module (not shown) or may be selected from a plurality of numbers that have been generated and stored in a device or a secure multimedia card in advance and combinations thereof. A random number may be a sequence of numbers or a sequence of characters. Accordingly, in embodiments of the present invention, a random number may be a number, a combination of numbers, or a sequence of characters, which are generated using the random number generation module. Alternatively, a random number may be a number or a sequence of characters, which is selected from numbers or sequences of characters that are stored in advance, or may be a combination of a plurality of selected numbers or a plurality of selected sequences of characters.

In an embodiment of the present invention, two random numbers are used during authentication between the device 310 and the secure multimedia card 320, thereby enabling safer DRM to be accomplished. In addition, due to the verification of a session key, it can be determined whether the authentication has been performed properly. In an embodiment of the present invention, a safe DRM operation between the device 310 and the secure multimedia card 320 can be guaranteed by using a session key generated during the authentication. Alternatively, for a much safer DRM operation, a verification procedure may be further provided after the authentication, which will be described with reference to FIG. 4.

Figure 4:
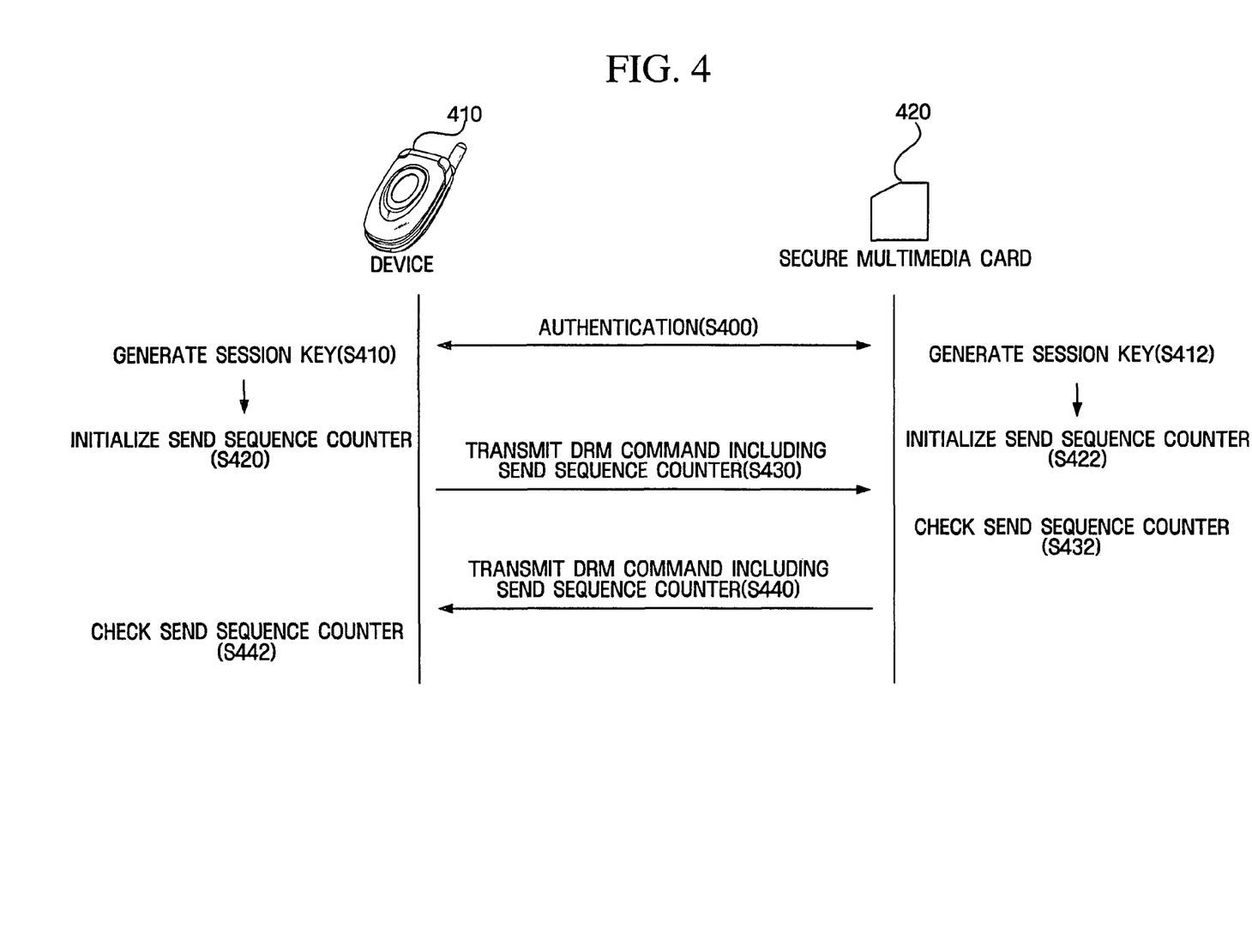
FIG. 4 is a diagram illustrating a DRM procedure in which a send sequence counter is used in an embodiment of the present invention.

FIG. 4 is a diagram illustrating a DRM procedure in which a send sequence counter is used in an embodiment of the present invention.

Diverse operations may be performed between a device 410 and a secure multimedia card 420. Operations such as a move, a copy, and a deletion of a rights object are involved with a DRM procedure for the rights object and a playback operation is involved with a DRM procedure for the content. Authentication between the device 410 and the secure multimedia card 420 is the premise of these DRM procedures. In other words, to perform a DRM procedure, authentication must be performed between the device 410 and the secure multimedia card 420 (S400). As a result of the authentication, the device 410 and the secure multimedia card 420 generate identical session keys, respectively (S410 and S412). After the device 410 and the secure multimedia card 420 share the session key, DRM procedures can be performed. To accomplish DRM with excellent security, a send sequence counter may be used. The send sequence counter is included in an application protocol data unit (APDU) and increases whenever the APDU is transmitted. For example, if one or more of the APDUs are intercepted, the send sequence counter included in the APDU has discontinuity. In addition, if an unauthorized user inserts an APDU, the send sequence counter also has discontinuity. An APDU is a unit used to transmit data such as an instruction, a rights object, or content and has a predetermined size. If the size of the data to be transmitted is smaller than the predetermined size of an APDU, the data is transmitted using a single APDU. If the size of the data to be transmitted is larger than that of the APDU, a plurality of APDUs are used to transmit the data. A DRM procedure using a send sequence counter will be described with reference to FIG. 4 below.

After the authentication (S400), the device 410 and the secure multimedia card 420 initialize their send sequence counters for a DRM procedure (S420 and S422). In an embodiment of the present invention, the send sequence counter is initially set to a number, that is, a combination of a random number$_H$ and a random number$_S$. For example, when the send sequence counter is two bytes in size, it may be initially set to a combination of the last one byte of the random number$_H$ and the last one byte of the random number$_S$. For example, if the last one byte of the random number$_H$ is "01010101" and the last one byte of the random number$_S$ is "11111110," the send sequence counter is initially set to "0101010111111110." When an initial value of the send sequence counter is obtained using the random number$_H$ and the random numbers, randomness can be increased compared to when the send sequence counter is initially set to "0000000000000000," and therefore, the DRM procedure can be performed more securely.

When the device 410 issues a DRM command to the secure multimedia card 420, the current value of the send sequence counter is included in an APDU (S430). If ten APDUs are transmitted for the DRM command, the send sequence counter increases by one from the initial value "0101010111111110" whenever each of the APDUs is transmitted. The secure multimedia card 420 checks the value of the send sequence counter in each received APDU and determines whether an inauthentic APDU is inserted during transmission or an authentic APDU is intercepted by an unauthorized user (S432).

When the secure multimedia card 420 issues a DRM command to the device 410, the current value of the send sequence counter is included in an APDU (S440). In an embodiment of the present invention, a value of the send sequence counter included in a first APDU for the DRM command may be the initial value to which the send sequence counter is initially set to. For example, when ten APDUs are transmitted for the DRM command, the send sequence counter may be increased by one from the initial value "0101010111111110" whenever each APDU is transmitted. In another embodiment of the present invention, the value of the send sequence counter included in the first APDU for the DRM command may be set based on a latest value of the send sequence counter. For example, when the latest value of the send sequence counter is "1000000000000000," a value of the send sequence counter included in the first APDU for the DRM command becomes "1000000000000001." The device 410 checks the value of the send sequence counter in each received APDU and determines whether an inauthentic APDU is inserted during transmission or an authentic APDU is intercepted (S442).

Sequentially increasing the send sequence counter is just an example. The send sequence counter may be decreased sequentially or increased or decreased by a value other than one, without departing from the spirit and scope of the present invention.

Figure 5:
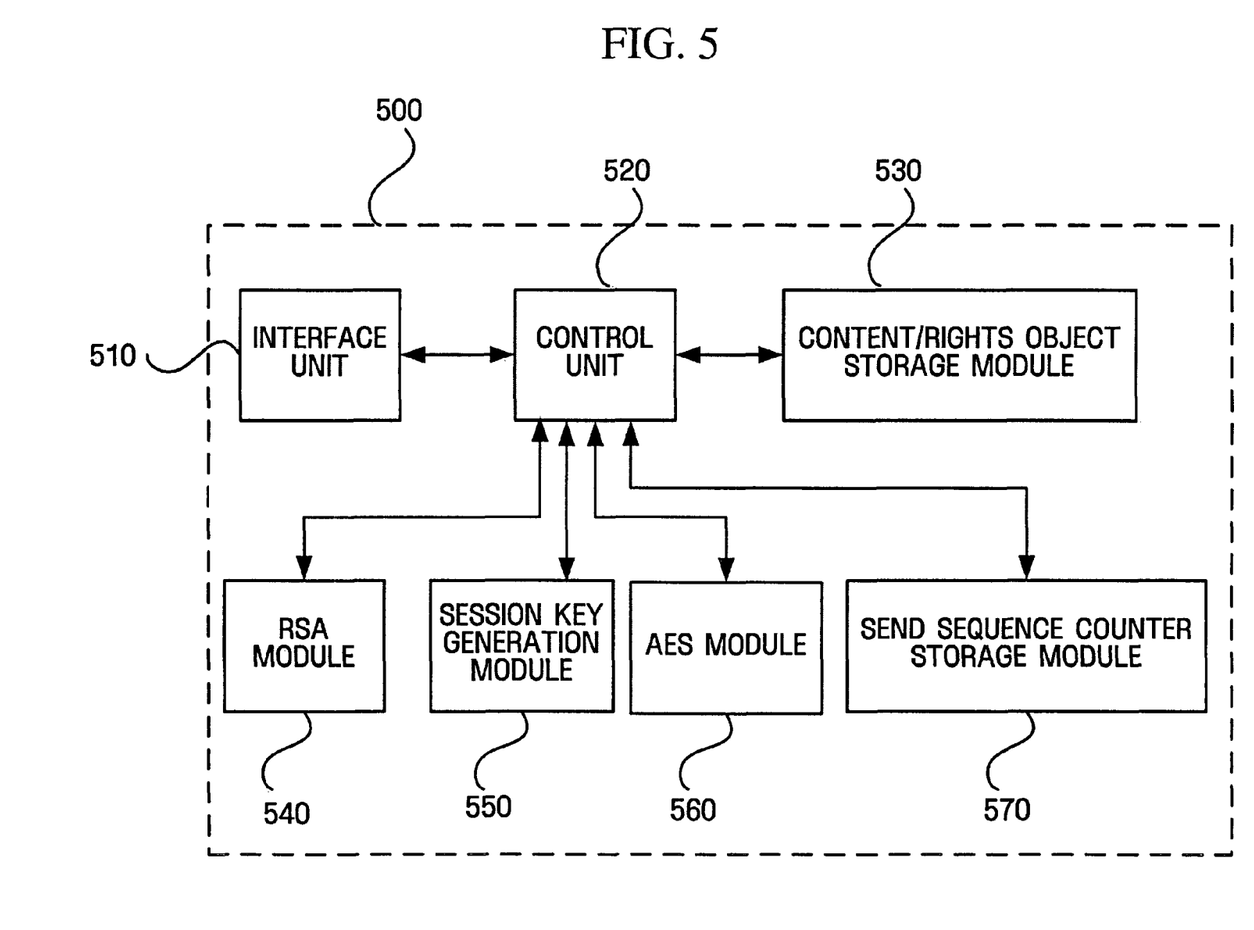
FIG. 5 is a functional block diagram of a secure multimedia card according to an embodiment of the present invention.

FIG. 5 is a functional block diagram of a secure multimedia card 500 according to an embodiment of the present invention.

In the illustrative embodiment, the term "module," as used herein, means, but is not limited to, a software or hardware component, such as a Field Programmable Gate Array (FPGA) or Application Specific Integrated Circuit (ASIC), which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

To implement a DRM procedure, the secure multimedia card 500 needs a security function, a function of storing content or a rights object, a function of exchanging data with a device, and a DRM function. To perform these functions, the secure multimedia card 500 includes an RSA module 540, a session key generation module 550, and an advanced encryption standard (AES) module 560 for the security function, a content/rights object storage module 530 with a storage function, an interface unit 510 allowing data exchange with the device, and a control unit 520 controlling each module to perform the DRM procedure. In addition, the secure multimedia card 500 includes a send sequence counter storage module 570 to detect unauthorized insertion or deletion of an APDU during transmission in the DRM procedure.

The interface unit 510 allows the secure multimedia card 500 to be connected with the device. When the secure MMC 500 is connected with the device, the interface unit 510 of the secure MMC 500 may be electrically connected with an interface unit of the device. However, the electrical connection is just an example, and the connection may indicate a state in which the secure MMC 500 can communicate with the device through a wireless medium without a physical contact. The interface unit 510 allows the secure MMC 500 to be connected with a device. A value of a send sequence counter of the secure MMC 500 is included in an APDU transferred between the secure MMC 500 and the device via the interface unit 510 to manage malicious attacks.

The RSA module 540 performs public-key encryption. More particularly, the RSA module 540 performs RSA encryption according to a request from the control unit 520. In embodiments of the present invention, during mutual authentication, the RSA encryption is used for key (random number) exchange or digital signature. However, the RSA encryption is just an example, and other public-key encryption may be used.

The session key generation module 550 generates a random number to be transmitted to the device and generates a session key using the generated random number and a random number received from the device. Meanwhile, instead of generating the random number in the session key generation module 550, the random number may be selected from a plurality of random numbers provided in advance, as described above.

The AES module 560 performs symmetric-key encryption using the generated session key. More particularly, the AES module 560 uses AES encryption to encrypt a content encryption key from a rights object (RO) with the session key and to encrypt other important information during communication with the device. The AES encryption is just an example, and other symmetric-key encryption such as DES encryption may be used.

The content/rights object storage module 530 stores encrypted contents and rights objects. The secure MMC 500 encrypts an RO according to the AES encryption using a unique key that cannot be read by other devices, and decrypts the RO using the unique key to allow the RO to be moved or copied to another device. The encrypting of an RO using the unique key according to the symmetric-key encryption is just an example. Alternatively, an RO may be encrypted using a private key of the secure MMC 500 and may be decrypted using a public key of the secure MMC 500 when necessary.

Figure 6:
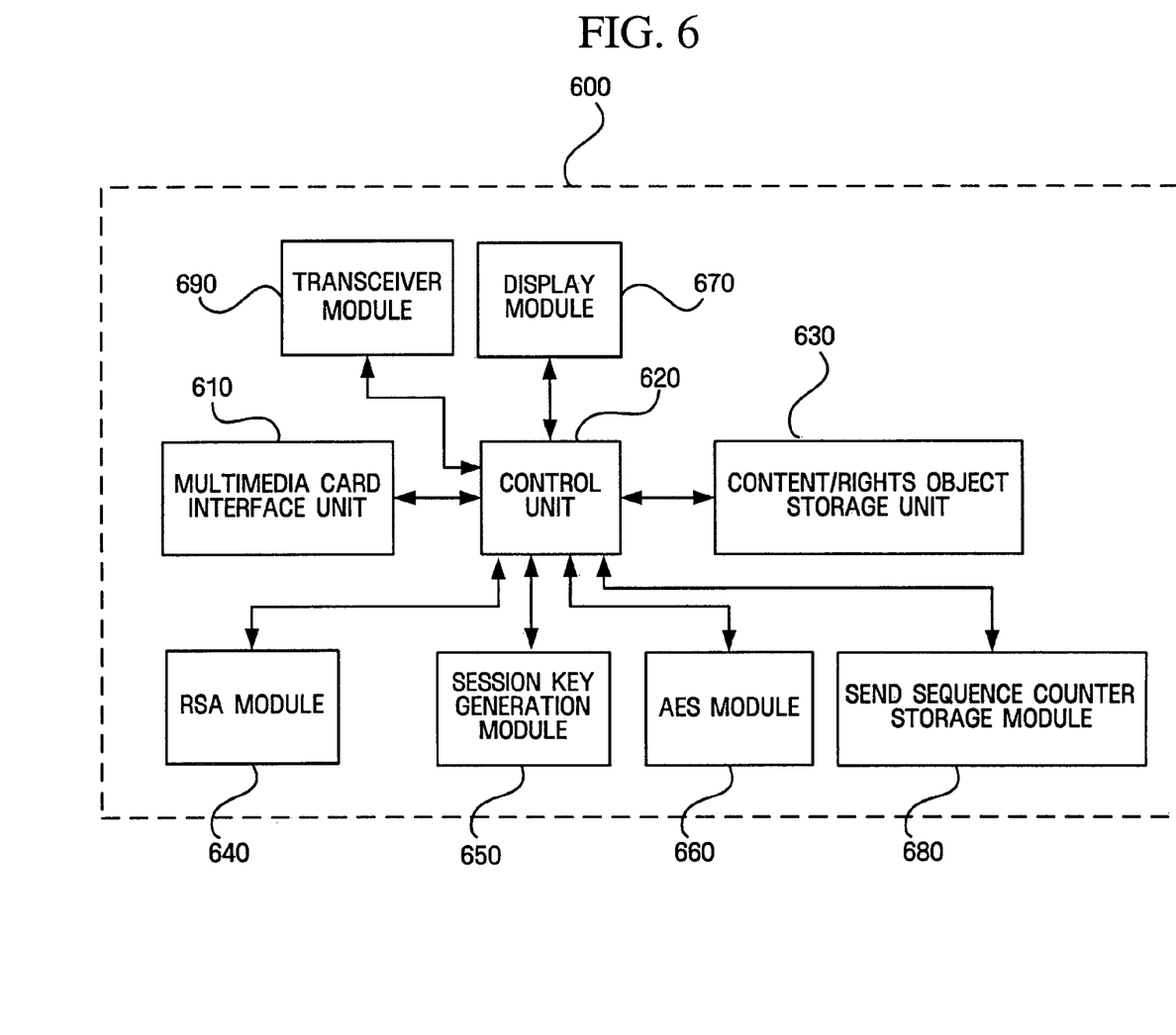
FIG. 6 is a functional block diagram of a device according to an embodiment of the present invention.

FIG. 6 is a functional block diagram of a device 600 according to an embodiment of the present invention.

To implement a DRM procedure, the device 600 needs a security function, a function of storing content or a rights object, a function of exchanging data with another device, a data transmit/receive function allowing communication with a contents issuer or a rights issuer, and a DRM function. To perform these functions, the device 600 includes an RSA module 640, a session key generation module 650, and an AES module 660 for the security function, a content/rights object storage module 630 with a storage function, a multimedia card (MMC) interface unit 610 allowing data exchange with a secure multimedia card, and a control unit 620 controlling each module to perform the DRM procedure. In addition, the device 600 includes a transceiver module 690 for the data transmit/receive function and a display module 670 displaying reproduced content. In addition, the device 600 includes a send sequence counter storage module 680 storing a value of a send sequence counter, which is used to detect unauthorized insertion or deletion of an APDU during transmission in the DRM procedure.

The transceiver module 690 allows the device 600 to communicate with a contents issuer or a rights issuer. The device 600 can acquire a rights object or encrypted content from an outside source through the transceiver module 690.

The MMC interface unit 610 allows the device 600 to be connected with a secure MMC. When the device 600 is connected with the secure MMC, the interface unit 610 of the device 600 may be electrically connected with an interface unit of the secure MMC. However, the electrical connection is just an example, and the connection may indicate a state in which the device 600 can communicate with the secure MMC through a wireless medium without a contact. A value of a send sequence counter of the device 600 is included in an APDU transferred between the device 600 and the secure MMC via the MMC interface unit 610 to manage malicious attacks.

The RSA module 640 performs public-key encryption. More particularly, the RSA module 640 performs RSA encryption according to a request from the control unit 620. In embodiments of the present invention, during mutual authentication, the RSA encryption is used for key (random number) exchange or digital signature. However, the RSA encryption is just an example, and other public-key encryption may be used.

The session key generation module 650 generates a random number to be transmitted to the secure MMC and generates a session key using the generated random number and a random number received from the secure MMC. The random number generated by the session key generation module 650 is encrypted by the RSA module 640 and then transmitted to the secure MMC through the MMC interface unit 610. Meanwhile, instead of generating the random number in the session key generation module 650, the random number may be selected from a plurality of random numbers provided in advance, as described above.

The AES module 660 performs symmetric-key encryption using the generated session key. More particularly, the AES module 660 uses AES encryption to encrypt a content encryption key from a rights object (RO) with the session key and to encrypt other important information during communication with the secure MMC. The AES encryption is just an example, and other symmetric-key encryption such as DES encryption may be used.

The content/rights object storage module 630 stores encrypted contents and rights objects. The device 600 encrypts an RO according to the AES encryption using a unique key that cannot be read by another device or the secure MMC, and decrypts the RO using the unique key to allow the RO to be moved or copied to the device. The encrypting of an RO using the unique key according to the symmetric-key encryption is just an example. Alternatively, an RO may be encrypted using a private key of the device 600 and may be decrypted using a public key of the device 600 when necessary.

The display module 670 visually displays playback of content whose rights object permits playback. The display module 670 may be implemented, for example, by a liquid crystal display (LCD) device such as a thin-film transistor (TFT) LCD device or an organic electroluminescent (EL) display device.

In concluding the detailed description, those skilled in the art will appreciate that many variations and modifications can be made to the disclosed exemplary embodiments without substantially departing from the principles of the present invention. Therefore, the disclosed embodiments of the invention are used in a generic and descriptive sense only and not for purposes of limitation.

According to the present invention, authentication between a device and a portable storage, which is the fundamental premise of DRM, can be performed securely. In addition, safe data transmission can be accomplished by means of a send sequence counter.

What is claimed is:

1. A method for performing authentication between a device and a portable storage, which is performed by the device, comprising:

transmitting a first key from the device to the portable storage;

receiving a third key and a first encrypted random number, wherein the first encrypted random number is obtained by encrypting a first random number using the first key, from the portable storage and decrypting the first encrypted random number using a second key related with the first key;

generating a second encrypted random number by encrypting a second random number using the third key after receiving the third key and the first encrypted random number, and transmitting the second encrypted random number from the device to the portable storage;

generating a session key using the first random number and the second random number, the first random number being generated by the portable storage, and the second random number being generated by the device;

receiving information regarding a time at which a certificate revocation list (CRL) of the portable storage is issued, from the portable storage, together with the first encrypted random number and the third key; and transmitting information regarding a time at which a CRL of the device is issued to the portable storage together with the second encrypted random number, receiving information indicating a session key generated by the portable storage; and verifying whether the session key generated by the device is identical with the session key generated by the portable storage.

2. The method of claim 1, wherein the first key and the second key are a related device public key and device private key, respectively, and the third key is a portable storage public key.

3. The method of claim 1, wherein the first key is transmitted through a device certificate to the portable storage, and the third key is received from the portable storage through a portable storage certificate.

4. A non-transitory computer-readable recording medium having embodied thereon computer executable instructions for executing the method of claim 1.

5. A method for performing authentication between a device and a portable storage, which is performed by the portable storage, comprising:
  receiving a first key from the device;
  obtaining a first encrypted random number by encrypting a first random number using the first key and transmitting the first encrypted random number and a third key to the device;
  receiving a second encrypted random number, obtained by encrypting a second random number using the third key, from the device after transmitting the first encrypted random number and the third key, and decrypting the second encrypted random number using a fourth key;
  generating a session key using the first random number generated by the portable storage and the second random number generated by the device,
  transmitting information regarding a time at which a certificate revocation list (CRL) of the portable storage is issued, to the device, together with the first encrypted random number;
  receiving information regarding a time at which a CRL of the device is issued, at the portable storage, together with the second encrypted random number and the first key, and
  transmitting information indicating the session key generated by the portable storage to the device to enable the device to verify whether a session key generated by the device is identical with the session key generated by the portable storage.

6. The method of claim 5, wherein the first key is a device public key, and the third and fourth keys are a related portable storage public key and portable storage private key, respectively.

7. The method of claim 5, wherein the third key is transmitted to the device through a portable storage certificate, and the first key is received from the device through a device certificate.

8. A non-transitory computer-readable recording medium having embodied thereon computer executable instructions for executing the method of claim 5.

* * * * *